Patented Feb. 15, 1949

2,461,702

UNITED STATES PATENT OFFICE 2,461,702

COMPOSITION FOR FLUOROSCOPIC OBSERVATION AND ROENTGENOGRAPHY

Elmer H. Slaybaugh, Parsons, Kans.

No Drawing. Application March 4, 1947,
Serial No. 732,372

1 Claim. (Cl. 167—95)

This invention relates to a composition for use in the fluoroscopic observation and roentgenography of the esophagus, rugae of the intestinal tract and gastro-enteric mucosa and the object thereof is to provide such a compound for use, for instance, in taking X-ray pictures, which produces no clinical after effects or side reactions, is soothing and non-irritating to mucosal tissues, contains no irritating gums or resins, is miscible with the contents of the digestive tract without affecting its chemistry, is anti-fermentative, due to the use of a preservative, is more adherent to the rugae of the intestinal tract and gastro-enteric musoca, because of the cohesive properties of the mucilaginous suspending agent, insures evenness of distribution of barium sulphate to photographic area, due to its ability to adhere to the mucosal membrane; which being in fine evenly dispersed suspension, insures evenness of flow through the intestinal tract without causing sagging, or pocketing of barium salts in the loops of the intestines, or in the rugae of the intestinal tract, in which each crystalline particle of barium sulphate is filmed with a very fine film of the gelatinous suspending agent, preventing any irritating or corrosive effect to the sensitive mucosal tissue, which is quickly and easily prepared for ready use without fuss or muss; freely and readily miscible, in any proportion of diluent such as water or milk and which retains its suspended state for long periods of time, without undue settling; which is palatable and pleasantly flavored, insuring patient comfort and cooperation; which is less constipating due to the lubricating effect within the intestines of the mucilaginous suspending agent, and which obtains or produces effectiveness of opacity determined by measurements and tests as conducted with the r'meter, and division of crystals in microform state as determined by microscopic examinations.

Another object of the invention is to provide a composition in which a suspension of barium sulphate is produced in a mucilaginous base including a pectin paste and a gastro-enteropaque and which avoids any chemical reaction between the barium and the pectin thereby avoiding any probability or possibility of creating a poisonous chemical such as barium chloride or any of the many poisonous salts of barium, because the ingredients are so compounded as to avoid creating any poisonous substance which would be injurious to the human body.

Another object of the invention is to provide a suspending agent in the form of pectin paste for the barium sulphate which avoids any chemical reaction or interaction between the constituents such as would produce or create any poisonous substance injurious to the human body when in use; which has a desirable viscosity and which will contain no possible soluble barium salts such as chlorides and sulfides or that when combined, will produce any change which would result in the formation of poisonous compounds and is therefore stable, effective and unobjectionable for the reasons stated and a perfect and safe preparation for use in the purposes stated, as well as free of harsh or irritating gums or resins, pleasantly flavored to take and of a heavy marshmallow-like consistency, thereby effectively producing quick and efficient observation of the parts referred to.

Another object of the invention is to provide a radio-paque medium to insure more clearly defined pictures of the esophagus, the rugae of the intestinal track, and more distinct visualization of the gastro-enteric mucosa and a distinct aid for rapid fluoroscopic observation.

Other objects and advantages will be apparent from the following description.

In the preparation of the composition, a pectin paste of the following formula is produced:

| | | |
|---|---|---|
| Pectin, NF VII | gm | 18.00 |
| Glycerine | cc | 18.00 |
| Benzoic acid | gm | .75 |
| Physiological salt sol | cc | 360.00 |

The manner of preparing the pectin paste is as follows:

Heat the physiological salt solution made with triple distilled water to 100° C. and add the benzoic acid. Thoroughly mix the pectin and glycerin in a large dry motor. Slowly add the hot salt-benzoic mixture to the pectin-glycerin mixture stirring all the time to keep from lumping. After a smooth homogeneous product is obtained, pour into a 500 cc. wide mouth powder jar. Let stand for 48 hours, occasionally shaking and turning the jar upside down to keep the pectin from settling in the jar. Add distilled water to make the preparation measure 360 cc.

Gastro-entero-paque

| | | |
|---|---|---|
| Pectin paste | cc | 360.00 |
| Vanilla extract | drops | 48 |
| Orange soluble or extract | do | 22 |
| Saccharin | grains | 3 |
| Barium sulphate | gm | 360.00 |

Triturate the barium with just enough water (distilled) to make a paste. Grind until all grits and lumps are removed. Dry this paste, still in the mortar, over a slow fire or flame until excess moisture is removed. Add the 360 cc. pectin paste slowly, stirring all the while. Add vanilla extract and orange extract or soluble orange. Dissolve the saccharine in 4 cc. of water and add to the product. Stir until the flavor and sweetening agents are thoroughly mixed and pour the finished product into a 500 cc. wide mouth jar.

The above means of preparation is demonstrated in its simplest form for explanatory purposes. It is not intended to limit the manufacture of this product to such a simple manner. The compound could be prepared by placing in a mechanical mixer and/or homogenizer, viscolizer, or grinder or a mechanical device intended for the manufacture of such compounds or other preparations.

The resulting product is a suspension of barium sulphate in a mucilaginous base. The result is a perfected and safe preparation of barium sulfate microform powder in a finely dispersed colloidal like state of suspension and a radio-paque insuring better diagnostic accuracy, and making possible more clear cut picture delineation. This preparation is especially prepared to meet the requirements in technic for depiction of the esophagus, rugae, and gastro-enteric mucosa, possessing both adhesive and cohesive properties free from harsh or irritating gums or resins, pleasantly flavored and of heavy marshmallow like consistency. The radio-paque medium insures more clearly defined pictures when taking pictures of parts of the body by X-rays, or for fluoroscopic examination and observation of the esophagus, the rugae of the intestinal tract and more distinct visualization of the gastro-enteric mucosa and especially also of the rugae or folds of the intestines and as a distinct aid for rapid fluoroscopic observation.

By way of clarifying an understanding of the invention, attention is directed to the fact that pectinum or pectin is authoratively described as the purified carbohydrate product obtained from the dilute acid extract of citrus peel or apple pomace consisting chiefly of partially methoxylated polygalacturonic acids. The pectin solution is simply a suspending agent for the barium sulfate. There is no chemical reaction or interaction between the barium sulfate and the pectin suspending media, as determined by chemical assay and analysis for the possible presence of soluble barium salts such as chlorides and sulfides also determined by acidifying with hydrochloric acid. Also, there is no indication that any change has taken place or that there is any possibility of having any poisonous compounds formed and with the use of a high-grade barium sulfate there is no reason to believe that the same will be changed in the medium in such a manner as to produce or create a poisonous chemical such as barium chloride or one of the many poisonous salts of barium or any poisonous substance which would be injurious to the human body. Therefore, the importance of the product is the fact that while there is no chemical reaction or interaction between the ingredients and especially between the barium and the pectin, a stable compound is produced in that the use of pectin paste as a suspending agent for the barium sulfate, will not cause any injurious effects due to chemical actions therein. The barium sulfate (U. S. P.) $BaSO_4$ with a mo. wt. of 233.42 when prepared with special care and subsequently purified, forms one of the most insoluble and also inert substances known to chemistry and is especially valuable in outlining the alimentary tract for X-ray work. It is insoluble in water, in organic solvents and in aqueous solutions of acids and alkalies.

The pectin paste formula is a simple mixture in which the pectin enters into solution with the glycerin and the physiological salt solution, the benzoic acid being used as a preservative without a chemical reaction noted in the simple solution.

In the formula for the gastro entero-paque, the pectin paste is utilized as a suspending media for the insoluble barium sulfate. There is no chemical reaction or interaction appearing in this compound when the pectin paste is used as a suspending medium for the barium sulfate. Since there is no resulting chemical action or interaction occurring when the barium sulphate is combined with the pectin paste, this produces an especially advantageous compound or paque for the purposes stated. The saccharine is used as a sweetening agent or substance instead of sugar, as it was found that when sugar had been used in sufficient quantity to sweeten the volume of compound, an enzymatic reaction resulted which produced a bacterial or enzymatic liquefaction of the pectin. It was found that when such reaction occurred, it caused the barium to precipitate out and settle out to the bottom in a hard cement-like deposit, which is entirely avoided by the present invention and particularly in the use of saccharine. The vanilla and orange extracts are merely flavoring agents, the blending of which produces the tasty marshmallow-like flavor desirable in preparation of this sort for internal use.

Thus, it will be seen that I have provided a very desirable compound for the purposes stated, possessing all of the advantages enumerated and it is to be understood that the invention is not limited to the proportions stated except as determined by the claim.

What I claim is:

A composition for use in the fluoroscopic observation and roentgenography of the esophagus, rugae of the intestinal tract, and gastroenteric mucosa, comprising a homogeneous mucilaginous mixture of finely powdered barium sulphate 360.00 grams, and pectin paste formed of pectin NF VII 18.00 grams, glycerine 18.00 cc., benzoic acid .75 gram, and physiological salt solution of sufficient quantity to make 360.00 cc. of said paste, said mixture being a viscous liquid in which the pectin and the barium sulphate are evenly dispersed and maintained in suspension.

ELMER H. SLAYBAUGH.

REFERENCES CITED

The following references are of record in the file of this patent:

UNITED STATES PATENTS

| Number | Name | Date |
|---|---|---|
| 1,644,446 | Rapp | Oct. 9, 1927 |
| 2,166,868 | Jones | July 18, 1939 |

FOREIGN PATENTS

| Number | Country | Date |
|---|---|---|
| 295,124 | Germany | Nov. 7, 1916 |

OTHER REFERENCES

Bulletin of the National Formulary Committee, Oct. 1940, vol. 9, pages 38 and 39.

The Extra Pharmacopoeia, vol. 1, 22nd ed. (1941), page 288.